(12) United States Patent
Maruta

(10) Patent No.: US 11,285,404 B2
(45) Date of Patent: Mar. 29, 2022

(54) PACKING MATERIAL FOR SIZE EXCLUSION CHROMATOGRAPHY AND METHOD FOR PRODUCING THE SAME

(71) Applicant: SHOWA DENKO K. K., Tokyo (JP)

(72) Inventor: Shuhei Maruta, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 16 days.

(21) Appl. No.: 16/487,329

(22) PCT Filed: Feb. 9, 2018

(86) PCT No.: PCT/JP2018/004665
§ 371 (c)(1),
(2) Date: Aug. 20, 2019

(87) PCT Pub. No.: WO2018/155241
PCT Pub. Date: Aug. 30, 2018

(65) Prior Publication Data
US 2020/0054967 A1 Feb. 20, 2020

(30) Foreign Application Priority Data
Feb. 27, 2017 (JP) .............. JP2017-034792

(51) Int. Cl.
*B01D 15/34* (2006.01)
*G01N 30/02* (2006.01)

(52) U.S. Cl.
CPC ............. *B01D 15/34* (2013.01); *G01N 30/02* (2013.01); *G01N 2030/027* (2013.01)

(58) Field of Classification Search
CPC .. B01J 20/3206; B01J 20/3208; B01J 20/285; G01N 30/88; G01N 30/02
See application file for complete search history.

(56) References Cited

U.S. PATENT DOCUMENTS

| | | | | |
|---|---|---|---|---|
| 6,482,867 B1 * | 11/2002 | Kimura | ............ | B01D 15/08 210/198.2 |
| 7,205,361 B2 * | 4/2007 | Mano | ............ | B01D 15/325 525/242 |
| 7,811,453 B2 | 10/2010 | Yotani et al. | | |
| 8,968,562 B2 | 3/2015 | Yotani et al. | | |
| 9,051,355 B2 | 6/2015 | Tamori et al. | | |
| 9,090,665 B2 | 7/2015 | Tamori et al. | | |
| 2005/0222279 A1 | 10/2005 | Larsson et al. | | |
| 2009/0042307 A1 | 2/2009 | Yotani et al. | | |
| 2009/0258428 A1 | 10/2009 | Okada et al. | | |
| 2010/0029114 A1 | 2/2010 | Komiya et al. | | |
| 2010/0330689 A1 | 12/2010 | Yotani et al. | | |
| 2011/0247981 A1 | 10/2011 | Ono et al. | | |
| 2013/0023650 A1 | 1/2013 | Tamori et al. | | |
| 2013/0041135 A1 | 2/2013 | Tamori et al. | | |
| 2013/0085199 A1 | 4/2013 | Tamori et al. | | |
| 2016/0068651 A1 | 3/2016 | Sahouani et al. | | |
| 2017/0043320 A1 * | 2/2017 | Momiyama | ............ | G01N 30/02 |
| 2017/0145051 A1 | 5/2017 | Momiyama et al. | | |

FOREIGN PATENT DOCUMENTS

| | | | |
|---|---|---|---|
| CN | 101257969 A | 9/2008 | |
| CN | 102834407 A | 12/2012 | |
| CN | 102834415 A | 12/2012 | |
| EP | 3076170 A1 | 10/2016 | |
| JP | 61-38462 A | 2/1986 | |
| JP | 61038462 A * | 2/1986 | ........... G01N 30/482 |
| JP | 62-79356 A | 4/1987 | |
| JP | 63-3006 A | 1/1988 | |
| JP | 2000-74894 A | 3/2000 | |
| JP | 2007-057526 A | 3/2007 | |
| JP | 2007-170907 A | 7/2007 | |
| JP | 4440771 B2 | 3/2010 | |
| JP | 2010-137207 A | 6/2010 | |
| JP | 2012-141212 A | 7/2012 | |
| WO | 2006/132333 A1 | 12/2006 | |
| WO | 2015/199196 A1 | 12/2015 | |

OTHER PUBLICATIONS

Extended European Search report dated Dec. 7, 2020 from the European Patent Office in Application No. 18758435.4.
International Search Report for PCT/JP2018/004665, dated May 15, 2018.
Office Action dated Sep. 15, 2021 in Chinese Application No. 201880008890.7.

* cited by examiner

*Primary Examiner* — Ryan B Huang
(74) *Attorney, Agent, or Firm* — Sughrue Mion, PLLC

(57) ABSTRACT

An object of the present invention is to provide a packing material suitable for use as a packing material for size exclusion chromatography for fractionation that requires large-scale treatment, the packing material being capable of being produced by a simple process and reducing column pressure drop even when the particle diameter is small, and is to provide a method for producing the packing material. In the present invention, a packing material for size exclusion chromatography is obtained by a production process including polymerizing glycerol 1,3-dimethacrylate and glycidyl methacrylate in the presence of a polymerization initiator, hydrophilizing the resulting porous particles made of a copolymer using a sugar alcohol, and then opening the rings of remaining glycidyl groups using a mineral acid.

6 Claims, 1 Drawing Sheet

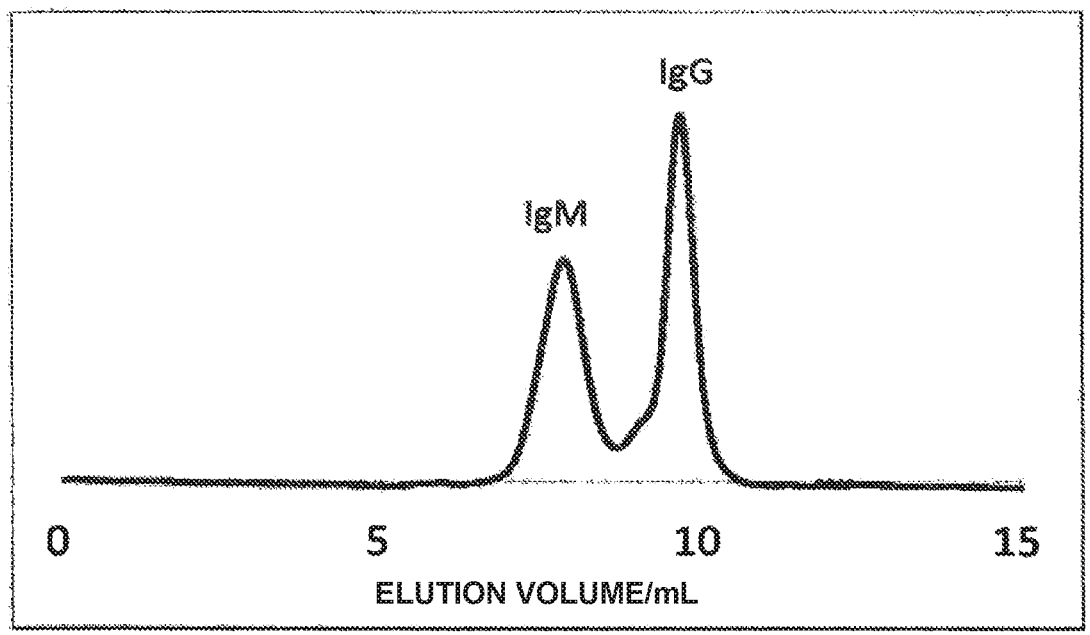

PACKING MATERIAL FOR SIZE EXCLUSION CHROMATOGRAPHY AND METHOD FOR PRODUCING THE SAME

CROSS REFERENCE TO RELATED APPLICATIONS

This Application is a National Stage of International Application No. PCT/JP2018/004665 filed Feb. 9, 2018, claiming priority based on Japanese Patent Application No. 2017-034792 filed Feb. 27, 2017.

TECHNICAL FIELD

The present invention relates to a packing material for fractionation of biopolymers. More specifically, the present invention relates to a packing material suitable for separation and fractionation of bio-derived polymers such as polysaccharides, peptides, proteins, DNAs, and RNAs using an aqueous eluent on the basis of the principle of size exclusion chromatography.

BACKGROUND ART

Size exclusion chromatography, which is used to separate molecules in order of size, is widely used to separate water-soluble polymers such as polysaccharides, peptides, proteins, DNAs, and RNAs. Size exclusion chromatography is advantageous in that biopolymers can be separated and fractionated with a low degree of denaturation because the biopolymers can be treated under mild conditions particularly in the case of separation and fractionation of biopolymers such as proteins. Biopolymers that have been separated and fractionated are used in applications for biochemical reactions and in industrial applications in the food, pharmaceutical, and chemical industries. The market for such biopolymers is remarkably expanding and growing in recent years. To meet the demand, packing materials for separation and fractionation applicable to treatment of a large volume appropriate to an industrial scale are desired. In particular, proteins such as immunoglobulin M (IgM) and immunoglobulin G (IgG), which are antibodies contained in living bodies, are attracting attention for medical applications. Packing materials that enable efficient separation and fractionation of such proteins are therefore strongly desired.

For analytical uses, various packing materials for size exclusion chromatography packed into columns are already on the market. Particles of packing materials for analytical uses have average particle diameters of about 3 to 15 μm. These packing materials can be used as packing materials for fractionation when the amount of biopolymers to be fractionated is small. However, to use the packing materials for treatment of a large volume on an industrial scale, the packing materials are required to be packed into large columns. This case has had a problem that an excessively high back pressure is applied on the apparatus because the average particle diameter of a packing material for analytical uses is too small.

On the other hand, packing materials for fractionation already on the market usually have insufficient mechanical strength. The case where such packing materials have small average particle diameters has had problems that compaction due to the shortage of mechanical strength progresses, and an increase in the column pressure drop and clogging of the column tend to often occur. Hence, a large number of commercially available packing materials for fractionation are packing materials having larger average particle diameters, such as, typically, 50 μm or more. When the average particle diameter is large, the back pressure does not increase, and a large amount of biopolymers can be separated and fractionated. However, a packing material having a large average particle diameter has a problem that separation performance based on the principle of size exclusion decreases. To ensure sufficient separation performance, use of the packing material at a low linear velocity is unavoidable, which prolongs the operation.

Proposed examples of technologies to provide packing materials with high mechanical strength include the following.

Patent Literature 1 discloses that a porous carrier that does not cause compaction and has sufficient mechanical strength is provided by a reaction of a base material made of ethylene glycol dimethacrylate and glycidyl methacrylate with ethylene glycol, glycerol, or the like in either one or both of dimethyl sulfoxide and 1,4-dioxane in the presence of a base.

Patent Literature 2 discloses that a hyperbranched hydrophilic polyhydroxy-functional polymer is covalently attached onto a synthetic-polymer packing material into which ion exchange groups have been introduced, in order to impart a high retention volume of proteins to the packing material. It is reported that this technology imparts sufficient chemical stability and robustness to the packing material.

CITATION LIST

Patent Literatures

Patent literature 1: Japanese Patent Laid-Open No. 2012-141212
Patent literature 2: Japanese Patent No. 4440771

SUMMARY OF INVENTION

Technical Problem

Various reports have been made as described above, but packing materials that have sufficient mechanical strength and are suitable for fractionation have still been desired. In particular, a packing material that has sufficient mechanical strength and provides a small back pressure on a column when packed with the packing material even if the average particle diameter is about 10 to 15 μm has been desired.

An object of the present invention is to solve the above problems. More specifically, an object of the present invention is to provide a packing material for size exclusion chromatography that can be produced by a simple process, has a low column pressure drop even when the particle diameter is small, and can be suitably used for separation and fractionation that require large-scale treatment, and to provide a method for producing the packing material.

Solution to Problem

As a result of diligent studies to solve the above object, the present inventors have found that the target packing material can be provided by polymerizing a monomer containing a glycidyl group and a crosslinking agent in the presence of a polymerization initiator, hydrophilizing the resulting porous particles made of a copolymer using a sugar alcohol, and then opening the rings of remaining glycidyl groups using a mineral acid. The present invention has thus been completed. That is, the present invention relates to the following matters.

[1] A packing material for size exclusion chromatography, comprising porous particles comprising a structure represented by the following formula (I) on a surface of a copolymer comprising at least glycerol 1,3-dimethacrylate and glycidyl methacrylate as monomer units:

[Chem. 1]

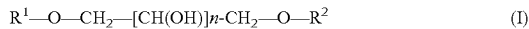

$$R^1-O-CH_2-[CH(OH)]n\text{-}CH_2-O-R^2 \qquad (I)$$

wherein $R^1$ represents a partial structure of the porous particles, $R^2$ represents a hydrogen atom or the partial structure of the porous particles, and n represents an integer of 1 to 5, and
wherein a ring-opening rate of glycidyl groups of the porous particles is 95% or more.

[2] The packing material for size exclusion chromatography according to [1], wherein the copolymer comprises 6 to 29 mol % of glycerol 1,3-dimethacrylate and 71 to 94 mol % of glycidyl methacrylate as the monomer units.

[3] The packing material for size exclusion chromatography according to [1] or [2], wherein n in the formula (I) is 4.

[4] A method for producing a packing material for size exclusion chromatography, comprising the following steps (1) to (3):
(1) a first step of polymerizing monomers comprising at least glycerol 1,3-dimethacrylate and glycidyl methacrylate with a diluent being added using a radical polymerization initiator in an aqueous medium to provide porous particles containing glycidyl groups;
(2) a second step of dispersing the porous particles containing glycidyl groups into an aqueous solution containing a dissolved sugar alcohol, adding an aqueous solution containing an alkali metal hydroxide, and heating and stirring the resulting mixture to bond the sugar alcohol to the glycidyl groups; and
(3) a third step of dispersing the porous particles with the sugar alcohol bonded obtained in (2) into an aqueous solution containing a mineral acid and heating and stirring the resulting dispersion to open the rings of remaining glycidyl groups.

[5] The method for producing a packing material according to [4], wherein a ring-opening rate of the glycidyl groups after completion of the third step is 95% or more.

[6] The method for producing a packing material according to [4] or [5], wherein the porous particles containing glycidyl groups comprise a copolymer comprising 6 to 29 mol % of glycerol 1,3-dimethacrylate and 71 to 94 mol % of glycidyl methacrylate as monomer units.

[7] The method for producing a packing material according to any one of [4] to [6], wherein the sugar alcohol is sorbitol.

[8] A packing material for size exclusion chromatography, comprising hydrophilic porous particles having a volume-average particle diameter of 8 to 15 μm,
wherein a pressure drop per 30 cm length of the packing material packed into a column is 1.2 MPa or less at a linear velocity of water of 100 cm/h,
wherein a hydrophilicity ratio represented by an elution volume ratio between 1-butanol and ethylene glycol is 1.0 to 1.4,
wherein an ionicity ratio represented by elution volumes of lysozyme and myoglobin is 0.8 to 1.2, and
wherein an exclusion limit molecular weight of pullulan is 1,000,000 or more.

[9] A column for size exclusion chromatography, comprising a housing for liquid chromatography and the packing material according to any one of [1] to [3] packed into the housing for liquid chromatography.

[10] A chromatography apparatus comprising the column for size exclusion chromatography according to [9].

[11] A method for separating and fractionating biopolymers, comprising separating the biopolymers with an aqueous eluent using the column for size exclusion chromatography according to [9].

Advantageous Effects of Invention

The present invention enables a high-separation-performance packing material having a small average particle diameter to be used in a large-sized column. Therefore, the speed of the separation treatment can be enhanced. In addition, the packing material can be produced from inexpensive raw materials by a simple process and can be easily applied to an industrial scale in which a large amount of the packing material is used.

BRIEF DESCRIPTION OF DRAWING

FIG. 1 is a chromatogram showing separation of IgM and IgG when a packing material of Example 1 is used.

DESCRIPTION OF EMBODIMENT

Hereinafter, an embodiment of the present invention will be described in detail, but materials, dimensions, and the like mentioned below are just examples and the present invention is not limited thereto. The embodiment can be appropriately modified as long as its gist is not changed.

A packing material for size exclusion chromatography of the present invention is porous particles including a structure represented by the following formula (I) on the surface of a copolymer containing at least glycerol 1,3-dimethacrylate and glycidyl methacrylate as monomer units:

[Chem. 2]

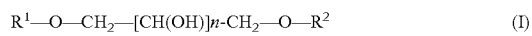

$$R^1-O-CH_2-[CH(OH)]n\text{-}CH_2-O-R^2 \qquad (I)$$

wherein $R^1$ represents a partial structure of the porous particles, $R^2$ represents a hydrogen atom or the partial structure of the porous particles, and n represents an integer of 1 to 5, and
wherein the ring-opening rate of glycidyl groups of the porous particles is 95% or more.

The packing material for size exclusion chromatography of the present invention can be produced by, for example, a method for producing a packing material for size exclusion chromatography including the following steps (1) to (3).

[First Step]
<Production of Porous Particles Containing Glycidyl Groups>

In the present invention, porous particles containing glycidyl groups made of a copolymer containing at least glycerol 1,3-dimethacrylate and glycidyl methacrylate as monomer units are used as a base material. The porous particles are obtained by copolymerizing glycerol 1,3-dimethacrylate, which is a hydrophilic crosslinkable monomer, with glycidyl methacrylate, which is a monomer containing a glycidyl group, in the presence of a diluent. These porous particles can be produced with reference to the methods described in Japanese Patent Laid-Open No. 2007-170907 and WO 2006/132333, and the like.

The copolymer may contain other monomer units within a range not greatly changing the properties of the porous particles as long as the copolymer contains 95 mol % or more in total of glycerol 1,3-dimethacrylate and glycidyl methacrylate as monomer units. Examples of a monomer containing glycidyl groups among the other monomers include 3,4-epoxycyclohexylmethyl methacrylate and 4-hydroxybutyl acrylate glycidyl ether. As the hydrophilic cross-linkable monomer, for example, a (meth)acrylic ester of a polyhydric alcohol selected from pentaerythritol di(meth)acrylate, pentaerythritol tri(meth)acrylate, glycerol 1,3-diacrylate, and glycerol methacrylate acrylate is preferably used. Besides the above esters, methyl (meth)acrylate, ethyl (meth)acrylate, or the like can be used. In the present specification, "(meth)acrylate" means acrylate and methacrylate.

The amount of glycidyl methacrylate to be used is 70 to 95 mol %, preferably 80 to 90 mol %, based on the total amount of the monomer mixture subjected to copolymerization. If the amount of glycidyl methacrylate is 70 mol % or more, the hydrophilicity is sufficient for use as a packing material for size exclusion chromatography. If the amount is 95 mol % or less, the mechanical strength is retained and compaction of the packing material in the column is prevented.

The amount of glycerol 1,3-dimethacrylate to be used is 5 to 30 mol %, preferably 10 to 20 mol %, based on the total amount of the monomer mixture subjected to copolymerization. If the amount of glycerol 1,3-dimethacrylate is 30 mol % or less, the hydrophilicity is sufficient for use as a packing material for size exclusion chromatography. If the amount is 5 mol % or more, the mechanical strength is retained, and compaction of the packing material in the column is prevented.

The porous particles have pores. For the purpose of imparting porosity, a diluent is added to the monomer mixture before polymerization. The diluent is an organic solvent that is soluble in the monomer mixture, is inert to polymerization, and does not dissolve the copolymer to be produced. Removing the diluent by washing or the like after completion of polymerization makes portions occupied by the diluent hollow to form pores in the particles.

Examples of the diluent include aromatic hydrocarbons such as toluene, xylene, diethylbenzene, dodecylbenzene, and chlorobenzene; saturated hydrocarbons such as hexane, heptane, pentane, octane, nonane, and decane; alcohols such as isoamyl alcohol, hexyl alcohol, heptyl alcohol, octyl alcohol, and nonyl alcohol; aliphatic halogenated hydrocarbons such as dichloromethane, dichloroethane, and trichloroethane; and aliphatic or aromatic esters such as ethyl acetate, propyl acetate, butyl acetate, pentyl acetate, methyl benzoate, ethyl benzoate, and propyl benzoate. These diluents can be used singly or as a mixture of two or more diluents.

The amount of addition of the diluent affects the exclusion limit molecular weight and the percentage by volume of the pore volume (proportion of the pore volume to the total volume of the packing material particles) of the packing material. Hence, the amount of addition is adjusted as appropriate. The amount of addition of the diluent is preferably 100 to 300 parts by mass based on a total of 100 parts by mass of the monomers.

A polymerization initiator is added to the monomer mixture to which the diluent has been added. The polymerization initiator is not particularly limited as long as the initiator is a known radical polymerization initiator that generates free radicals. Examples of the polymerization initiator include azo initiators such as 2,2'-azobisisobutyronitrile and dimethyl 2,2'-azobis(isobutyrate). Among these initiators, dimethyl 2,2'-azobis(isobutyrate) is desirably used in terms of the affinity of the chemical structure. The concentration of the polymerization initiator is not particularly limited, but is preferably 0.1 to 5 parts by mass based on a total of 100 parts by mass of the monomers.

An oil phase containing the monomers is prepared using the monomer mixture, the diluent, and the polymerization initiator. The oil phase is formed into oil droplets by stirring and suspending the oil phase in an aqueous medium containing an appropriate dispersion stabilizer. Polymerization in this state (suspension polymerization) generates a copolymer in the form of porous particles having appropriate particle diameters. Besides the method by stirring as described above, a method in which a monomer solvent containing the diluent is added dropwise to the aqueous medium through a porous membrane or a microchannel formed on a quartz substrate can be applied to the production method of oil droplets.

Known stabilizers can be used as the dispersion stabilizer contained in the aqueous medium. A water-soluble polymer compound such as gelatin, sodium polyacrylate, or polyvinyl alcohol is usually used. Polyvinyl alcohol is generally used. The concentration of the dispersion stabilizer is preferably 0.1 to 5 mass % based on the aqueous medium.

The aqueous medium may contain a water-soluble component including salts in addition to water. Examples of the salts include common salts such as sodium chloride and calcium chloride. The concentration cannot be exactly specified because the solubility differs among salts. For example, the concentration of the salt to be dissolved is preferably 0.1 to 15 mass % for sodium chloride and 1 to 40 mass % for calcium chloride.

The polymerization reaction in the form of oil droplets is carried out for 5 to 16 hours under atmospheric pressure after replacing with nitrogen gas and, commonly, heating to 40 to 100° C. with stirring. At that time, the monomers contained in each oil droplet are polymerized with the diluent enclosed therein, and the polymer grows reticulately. Succeeding removal of the diluent thus provides the porous particles. After the reaction, the porous particles can be easily separated from the aqueous medium by filtration or other methods. In addition, washing with a solvent such as acetone or methanol is performed to remove the diluent. After being dried, the resulting porous particles containing glycidyl groups are classified with a sieve or an air classifier.

The average particle diameter of the particles is represented by the volume-average particle diameter. The volume-average particle diameter is a value obtained using a particle size distribution analyzer with image analysis. When a particle size distribution analyzer with image analysis is used to measure the volume-average particle diameter of the particles, the volume-average particle diameter is obtained by obtaining the Heywood diameter (diameter of a circle having an area equivalent to the area of the projected image of a particle) of each particle from a two-dimensional particle image (preferably a still image) obtained by imaging 2,000 or more crosslinked polymer particles with a particle size distribution analyzer with image analysis, calculating the volume of each particle from the Heywood diameter, and averaging the diameters on the basis of the volume. In the calculation, each particle is regarded as a sphere having the same diameter as the Heywood diameter above. For example, a flow particle image analyzer (product name: FPIA-3000, manufactured by Sysmex Corporation) can be used as the particle size distribution analyzer with image analysis.

The average particle diameter of the porous particles is preferably 8 to 15 µm, more preferably 10 to 13 µm.

[Second Step]

<Reaction of Porous Particles Containing Glycidyl Groups with Sugar Alcohol>

The porous particles containing glycidyl groups obtained by the above process is subjected to the reaction with a sugar alcohol in the presence of an aqueous solution containing an alkali metal hydroxide for the purpose of hydrophilization and crosslinking. Mainly a primary hydroxy group of the sugar alcohol reacts with the glycidyl group in the partial structure on the surface of a porous particle to form an ether linkage with the porous particle, thereby imparting hydrophilicity to the surface of the porous particle. The structure derived from the sugar alcohol bonded contains a primary hydroxy group at the other terminal. When there is another glycidyl group that can react near the primary hydroxy group, further reaction and crosslinking occur. Such reactions with the sugar alcohol enhance the mechanical strength of the porous particles. In addition, the chemical stability of the porous particles is also improved, progress of hydrolysis of ester groups, amide groups, and the like constituting the monomers when the rings of the remaining glycidyl group are opened later is suppressed, generation of ionic functional groups in the packing material is suppressed, and therefore the packing material can be kept nonionic. As described above, the reaction with the sugar alcohol improves both the mechanical strength and the properties of the particles, which have been insufficient so far.

The structure formed on the surface of the porous particle by the reaction with the sugar alcohol can be represented by the chemical formula as formula (I). The partial structure of the porous particle represented by $R^1$ is, for example, •—CO—O—CH$_2$—CH(OH)—CH$_2$— derived from the glycidyl group on the pours surface. The symbol "•" represents the porous particle body. When $R^2$ in the formula (I) is the partial structure of the porous particle, a similar partial structure serves as an example. In this case, the sugar alcohol is bonded to the porous particle at two sites.

[Chem. 3]

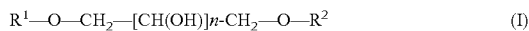

$$R^1\text{—O—CH}_2\text{—[CH(OH)]}n\text{-CH}_2\text{—O—}R^2 \qquad (I)$$

wherein $R^1$ represents the partial structure of the porous particle, $R^2$ represents a hydrogen atom or the partial structure of the porous particle, and n represents an integer of 1 to 5.

The reaction of the porous particles with the sugar alcohol can be carried out by adding an alkali metal hydroxide to an aqueous solvent in which the porous particles wet with ion exchanged water (also referred to as water-wet gel) and the sugar alcohol coexist and heating and stirring the resulting mixture. The water-wet gel contains water weighing one to three times the mass of the dry porous particles. The weight is equivalent to about 2.6 times the weight of the dry gel.

Various known sugar alcohols can be used as the sugar alcohol without particular limitation. Examples thereof include tritols such as glycerol; tetritols such as erythritol and threitol; pentitols such as arabinitol and xylitol; hexitols such as sorbitol and mannitol; and heptitols such as volemitol and perseitol. Among these substances, xylitol and sorbitol are preferable, and sorbitol is most preferable. The sugar alcohols can be used singly or in combination of two or more sugar alcohols. Among the above substances, a sugar alcohol having six or seven carbon atoms is preferable, and sorbitol is most preferable. That is, in the formula (I), n is preferably 4 or 5, more preferably 4.

The amount of the sugar alcohol to be used is preferably 200 to 3,000 parts by mass based on 100 parts by mass of the porous particles. If the amount of the sugar alcohol is less than 200 parts by mass, the introduced amount is likely to be small, resulting in insufficient hydrophilicity. If the amount of the sugar alcohol exceeds 3,000 parts by mass, the amount of the solvent required for dissolution may increase.

Various known alkali metal hydroxides can be used as the alkali metal hydroxide without particular limitation. Examples thereof include alkali metal hydroxides such as sodium hydroxide and potassium hydroxide. The amount to be used is preferably 0.2 to 60 parts by mass, particularly preferably 2 to 30 parts by mass, based on 100 parts by mass of the porous particles. If the amount of the alkali metal hydroxide is 0.2 parts by mass or more, sufficient hydrophilicity is imparted. If the amount of the alkali metal hydroxide is 60 parts by mass or less, the problem that ionic functional groups are generated by hydrolysis of ester groups and amide groups of the porous particles is prevented. The alkali metal hydroxides can be used singly or in combination of two or more alkali metal hydroxides. The resulting particles are washed with water to remove the excess sugar alcohol and alkali metal hydroxide.

[Third Step]

<Ring-Opening Reaction of Remaining Glycidyl Groups>

The porous particles that have reacted with the sugar alcohol contain glycidyl groups that are left unreacted. The remaining glycidyl groups make the porous particles more hydrophobic, which may result in hydrophobic adsorption of highly hydrophobic water-soluble compounds such as proteins. Hence, to enhance the hydrophilicity, opening of the rings of the remaining glycidyl groups with a mineral acid is desirable.

The fact that glycidyl groups are left can be confirmed by the following operation. That is, a part of the porous particles that have reacted with the sugar alcohol is mixed with potassium bromide, pelletized by pressure, and measured with an FT-IR (product name: Nicolet (registered trademark) iS10, manufactured by Thermo Fisher Scientific K.K.). The peak heights of the absorbance at 908 cm$^{-1}$ and 848 cm$^{-1}$ in the infrared absorption spectrum are determined. These absorption peaks are attributed to the epoxy structure. These peak heights of the porous particles that have reacted with the sugar alcohol are usually 80 to 95% of the heights of the corresponding peaks of the porous particles before the reaction. When the peak heights are actually compared, the peaks at 908 cm$^{-1}$ can be used because the baseline is flat and the measurement is easy.

The residual rate (%) of glycidyl groups is calculated from the following equation (1).

$$(\text{The residual rate of glycidyl groups}) = 100 \times (\text{the peak height after the reaction})/(\text{the peak height of the porous particles before the reaction with the sugar alcohol}) \qquad (1)$$

The ring-opening rate (%) of glycidyl groups is obtained from the equation (2).

$$(\text{The ring-opening rate of glycidyl groups}) = 100 - (\text{the residual rate of glycidyl groups}) \qquad (2)$$

After the porous particles that had reacted with the sugar alcohol were subjected to the ring-opening reaction using a mineral acid, measurement was carried out in the same manner and the results showed that the two peaks that had been observed for the porous particles before the reaction almost disappeared. The ring-opening reaction of the remaining glycidyl groups using the mineral acid can be carried out by adding the mineral acid to a suspension of the particles in an aqueous solvent and heating and stirring the resulting mixture.

Examples of the mineral acid include sulfuric acid, nitric acid, and hydrochloric acid. Among these acids, sulfuric acid is particularly preferable. The concentration of the mineral acid used is about 0.01 to 1.0 M, particularly preferably about 0.1 to 0.5 M. If the concentration of the mineral acid is 0.01 M or more, the ring-opening reaction is sufficiently carried out. A concentration of the mineral acid of 1.0 M or less is preferable because there is no possibility that ionic functional groups are generated by hydrolysis of ester groups and the like of the porous particles after the reaction with the sugar alcohol. By washing the resulting particles with water, the excess mineral acid is easily removed. This treatment increases the ring-opening rate of glycidyl groups to 95% or more.

To provide sufficient performance without hydrophobic adsorption of proteins, it is required that the peak height of the packing material at 908 cm$^{-1}$ be 5% or less of the corresponding absorbance peak height measured by FT-IR for porous particles obtained after polymerization (the amount of remaining glycidyl groups is 5% or less). That is, the ring-opening rate of glycidyl groups is required to be 95% or more. When the ring-opening rate is less than 95%, adsorption of hydrophobic proteins on the packing material used as a separation medium may be observed because of hydrophobicity of the packing material.

The packing material thus obtained shows low pressure drop, suitable hydrophilicity, low ionicity, and a suitable exclusion limit molecular weight as described below. Hence, by packing the packing material into a housing for liquid chromatography, a high-performance column for size exclusion chromatography is provided, and a chromatography apparatus including the column for size exclusion chromatography is also provided. In addition, by using the column for size exclusion chromatography, a method for separating and fractionating biopolymers is provided by which the biopolymers can be precisely separated and fractionated with an aqueous eluent.

<Column Pressure Drop>

The pressure drop indicates how much pressure is generated at the column inlet when an eluent is allowed to flow through a column packed with a packing material. In the present invention, the column pressure drop is represented as the pressure drop per 30 cm length of a packing material having a volume-average particle diameter of 8 to 15 μm packed into a column when water is allowed to flow at a linear velocity of 100 cm/h. Reference Example 1 described later discloses a specific measuring method. A small pressure drop value indicates that damage and deformation of the particles tend to be less caused by the flow of liquid and that the mechanical strength is high. In addition, if the pressure drop value is small, a larger linear velocity can be employed, so that quick separation and fractionation can be expected. Incorporating the reaction step with the sugar alcohol remarkably reduces the pressure drop value. The pressure drop is desirably 1.2 MPa or less, more preferably 1.0 MPa or less.

<Hydrophilicity>

The hydrophilicity is determined by the equation (3) on the basis of elution volumes of ethylene glycol and 1-butanol measured under the conditions disclosed in Reference Example 2 described later.

(Hydrophilicity)=(the elution volume of 1-butanol)/ (the elution volume of ethylene glycol)    (3)

1-Butanol is more hydrophobic than ethylene glycol. Hence, when the hydrophilicity of the packing material is low, 1-butanol is eluted more slowly than ethylene glycol because of hydrophobic interaction with the packing material. The closer to 1 the hydrophilicity value is, the more hydrophilic the particles are judged to be. A value of 1.0 to 1.4 is preferable for the purpose of separating biomolecules. If the value is 1.5 or more, the recovery may decrease because of nonspecific adsorption of the biopolymers. The ring-opening step of the remaining glycidyl groups provides the packing material having preferable hydrophilicity.

<Ionicity>

If the packing material is ionic, the problem arises that ionic interaction between biopolymers having electric charge and the packing material prevents separation of molecules in order of size, which is one of the advantages of size exclusion chromatography, during separation and fractionation of biopolymers. Hence, the ionicity of the packing material is preferably as low as possible. The ionicity is evaluated by measuring the ionicity. The ionicity is determined by the equation (4). The elution volumes of lysozyme and myoglobin can be determined by a method disclosed in Reference Example 3 described later.

(Ionicity)=(the elution volume of lysozyme)/(the elution volume of myoglobin)    (4)

When the packing material is ionic, basic lysozyme interacts with the packing material. Hence, the elution time differs from the elution time of myoglobin, which is a neutral protein of about the same size as lysozyme. The closer to 1 the value is, the more nonionic the particles are judged to be.

The value of nonionicity is preferably 0.8 to 1.2. The packing material that has not undergone the reaction with the sugar alcohol but has undergone only the ring-opening reaction of glycidyl groups has a larger value of nonionicity and thus causes problems.

<Exclusion Limit Molecular Weight>

The exclusion limit molecular weight is measured in accordance with Reference Example 4 described later. To separate macromolecular proteins by size exclusion chromatography, the exclusion limit molecular weight is preferably 1,000,000 or more. For example, when macromolecular proteins such as IgM having a molecular weight of about 900,000 and IgG having a molecular weight of about 150,000 are to be separated, an exclusion limit of 1,000,000 or less implies that IgM gets beyond the exclusion limit and cannot be separated.

<Resolution Between IgM and IgG>

The separation between IgM and IgG can be observed by a method disclosed in Example 1 described later. The resolution between IgM and IgG is calculated from measurement results. The resolution is calculated from the equation (5).

The resolution=1.18×[($T_2$−$T_1$)/($W_2$+$W_1$)]    (5)

wherein $T_1$ represents the elution time of IgM, $T_2$ represents the elution time of IgG, $W_1$ represents the half-width (the peak width at half the height of the peak) of the peak of IgM, and $W_2$ represents the half-width of the peak of IgG.

The resolution is preferably 1.5 or more, which indicates complete separation.

EXAMPLES

The following further clarifies the effects of the present invention referring to examples. The present invention is not limited to the following Examples and appropriate modifications may be made as far as the gist of the present invention is not changed.

Reference Example 1: Measurement Conditions for Pressure Drop

A wet packing material dispersed into water was fully packed into a stainless steel column with inner diameter of 8 mm and length of 300 mm by the balanced-density slurry method. To a line connected to a pump, a manometer and the inlet of the column packed with the packing material were connected in series. The column outlet was left open or connected to a pipe having such a large inner diameter as to ignore pressure drop. Ion exchanged water was allowed to flow at 0.85 mL/min using the pump. The linear velocity of water, which corresponded to an eluent, was 100 cm/hr. Five minutes after feeding of water was started, stabilization of the pressure was confirmed, and the pressure was read. This pressure was regarded as the column pressure drop.

Reference Example 2: Measurement Conditions for Hydrophilicity

Measurement was carried out by connecting a column packed in the same manner as in Reference Example 1 to a high-performance liquid chromatograph, allowing ion exchanged water to flow at a flow rate of 1.0 mL/min as the mobile phase, and injecting a sample containing ethylene glycol (5 mg/mL) and 1-butanol (5 mg/mL) prepared using ion exchanged water as a solvent into the 10-µL column. The elution time of each component was determined by the chromatogram obtained using a differential refractive index detector (product name: RI-201H, manufactured by Showa Denko K.K.), the elution volume was determined, and the elution volume ratio (the elution volume of 1-butanol)/(the elution volume of ethylene glycol) was determined and regarded as an index of hydrophilicity.

Reference Example 3: Measurement Conditions for Ionicity

A column packed in the same manner as in Reference Example 1 was connected to a high-performance liquid chromatograph, a 0.05 M phosphate buffer solution (pH 7)+a 0.3 M sodium chloride aqueous solution were allowed to flow at a flow rate of 1.0 mL/min as the mobile phase, and 10 µL of a sample containing 1 mg/mL of lysozyme (product number: L6876, manufactured by Sigma-Aldrich, Inc.) and 10 µL of a sample containing 5 mg/mL of myoglobin (product number: M0630, manufactured by Sigma-Aldrich, Inc.) were each injected into the column (to prepare the samples of lysozyme and myoglobin, the mobile phase was used as the solvent). The elution time of each component was determined by the chromatogram obtained using an ultraviolet absorptiometer (product name: SPD-20A, manufactured by Shimadzu Corporation) at a wavelength of 280 nm, the elution volume was determined, and the elution volume ratio (the elution volume of lysozyme)/(the elution volume of myoglobin) was determined and regarded as an index of ionicity.

Reference Example 4: Measurement of Exclusion Limit Molecular Weight Using Pullulan A column packed in the same manner as in Reference Example 1 was connected to a high-performance liquid chromatograph, ion exchanged water was allowed to flow at a flow rate of 1.0 mL/min as the mobile phase, a reference material with various molecular weights was injected into the column, and the exclusion limit molecular weight was determined using the elution volume by a commonly known method. A differential refractive index detector (product name: RI-201H, manufactured by Showa Denko K.K.) was used for detection, and a pullulan standard (product name: Shodex (registered trademark) STANDARD P-82, manufactured by Showa Denko K.K.) was used as the reference material.

Example 1

<Synthesis of Porous Particles Containing Glycidyl Groups (First Step)>

Dimethyl 2,2'-azobis(isobutyrate) was added to 27.7 g of glycidyl methacrylate (product name: Blemmer G (registered trademark) manufactured by NOF Corporation), 11.4 g of glycerol 1,3-dimethacrylate (product name: NK Ester 701, Shin Nakamura Chemical Co., Ltd.), and 61.9 g of chlorobenzene, and the mixture was stirred for dissolution to provide an organic phase. The amount of glycidyl methacrylate used was 80 mol % based on the total amount of monomers, the amount of glycerol 1,3-dimethacrylate used was 20 mol % based on the total amount of monomers, and the amount of the diluent used was 158 parts by mass based on a total of 100 parts by mass of monomers. An aqueous medium was provided by dissolving 15 g of polyvinyl alcohol and 15 g of sodium chloride in 500 g of ion exchanged water by stirring. The organic phase was added to the aqueous medium, and the mixture was subjected to high-speed stirring with Excel Auto Homogenizer (manufactured by Nihonseiki Kaisha Ltd.) for 5 minutes at 1,800 rpm to adjust the size of oil droplets to 1 to 50 µm, poured into a 1-L separable flask, and subjected to the reaction for 15 hours at an elevated temperature of 60° C. in a water bath in a nitrogen gas atmosphere with stirring at 100 rpm. After the mixture was cooled, the resulting copolymer particles were collected by filtration and washed with 1 L of ion exchanged water, then with 1 L of acetone, and with 1 L of ion exchanged water again. The resulting porous particles were classified into 10 to 15 µm with a sieve to provide 40.5 g of porous particles containing glycidyl groups.

<Reaction of Porous Particles Containing Glycidyl Groups with Sugar Alcohol (Second Step)>

39.1 g (100 parts by mass) of the porous particles were dispersed into 1 L of ion exchanged water and collected by filtration, so that the porous particles got wet with water. The wet porous particles weighed 102.7 g (containing 63.6 g of ion exchanged water). To a 1-L separable flask, 150 mL of ion exchanged water, 250 g (640 parts by mass) of D-sorbitol (manufactured by Kanto Chemical Co., Inc.) as sorbitol, and the wet porous particles were charged, and the mixture was stirred to form a dispersion. After that, 2.5 g (6.4 parts by mass) of potassium hydroxide was added, the temperature was raised to 60° C. with stirring at 200 rpm, and the mixture was subjected to the reaction for 15 hours. After the mixture was cooled, the porous particles were collected by filtration and washed with 1 L of ion exchanged water. The particles were dried to provide 39.8 g of porous particles that had reacted with the sugar alcohol.

<Ring-Opening Reaction of Remaining Glycidyl Groups (Third Step)>

38.4 g of the porous particles that had reacted with the sugar alcohol was dispersed into 1 L of ion exchanged water and collected by filtration to provide water-wet porous particles. To a 1-L separable flask, 700 mL of ion exchanged water and 24.7 g of a 47 mass % sulfuric acid were charged to prepare a 0.15 M sulfuric acid aqueous solution. About 100 g of the water-wet porous particles was added to the sulfuric acid aqueous solution, the temperature was raised to 60° C. with stirring at 200 rpm, and the mixture was subjected to the reaction for 2 hours. After the mixture was cooled, the porous particles were collected by filtration and washed with 1 L of ion exchanged water. The particles were dried to provide 40.5 g of a packing material.

The resulting packing material was measured in accordance with Reference Examples 1 to 4, and the results showed a pressure drop of 0.6 MPa, a hydrophilicity of 1.2, an ionicity of 1.1, and an exclusion limit molecular weight of 1,100,000. The absorbance peak at 908 cm$^{-1}$ was not observed by FT-IR. The ring-opening rate of glycidyl groups calculated in accordance with the method for determining the ring-opening rate of glycidyl groups disclosed in the section of [Third Step] above was 100%.

The packing material was packed into a stainless steel column with inner diameter of 8 mm and length of 300 mm by the balanced-density slurry method. The column was connected to a high-performance liquid chromatograph, and separation of biopolymers was evaluated. A 0.05 M phosphate buffer solution (pH 7)+a 0.3 M sodium chloride aqueous solution were allowed to flow at a flow rate of 1.0 mL/min as the mobile phase, and 10 μL of a sample containing 1 mg/mL of IgM (product number: 18135, manufactured by Sigma-Aldrich, Inc.) and 1 mg/mL of IgG (product number: 14506, manufactured by Sigma-Aldrich, Inc.) prepared using the mobile phase as a solvent was injected to conduct measurement. FIG. 1 shows a chromatogram obtained using an ultraviolet absorptiometer (product name: SPD-20A, manufactured by Shimadzu Corporation) at a wavelength of 280 nm. The resolution between IgM and IgG calculated by the above method was 1.65, which indicated good separation.

Examples 2 to 10

Packing materials were each provided in the same manner as in Example 1 except that the amount of potassium hydroxide used, the concentration of sulfuric acid, the amounts of glycidyl methacrylate and glycerol 1,3-dimethacrylate used, the amount of the diluent, and the type of the sugar alcohol in the process of producing the packing material described in Example 1 were changed as shown in Table 1. Table 1 shows the evaluation results (xylitol in Example 10 was a product manufactured by FUJIFILM Wako Pure Chemical Corporation).

Comparative Example 1

A packing material was provided in the same manner as in Example 1 except that the reaction with the sugar alcohol was omitted. Table 1 shows the evaluation results. Without the reaction with the sugar alcohol, an unpreferable packing material that showed high pressure drop and high ionicity was obtained.

Comparative Example 2

A packing material was provided through the same reactions as in Example 1 except that the ring-opening reaction of glycidyl groups was omitted. Table 1 shows the evaluation results. Without the ring-opening reaction using the mineral acid, a packing material that showed an unpreferable hydrophilicity value was obtained.

Comparative Example 3

Porous particles obtained by polymerization in the same manner as in Example 1 was used as a packing material without being subjected to the reaction with the sugar alcohol or the ring-opening reaction of glycidyl groups. Table 1 shows the evaluation results.

The ionicity could not be measured because lysozyme and myoglobin used for the measurement were not eluted because of nonspecific adsorption. A packing material that also showed unpreferable hydrophilicity was obtained.

Comparative Example 4

Shodex (registered trademark) OHpak (registered trademark) SB-804HQ (manufactured by Showa Denko K.K., having a particle diameter of 10 μm according to the catalog), which is commercially available, was evaluated. Table 1 shows the results.

It is shown that there is no problem with the pressure drop value in analytical uses but the packing materials of Examples 1 to 10 are superior for fractionation purposes because these packing materials showed lower pressure drops.

In Table 1, glycerol 1,3-dimethacrylate is represented as GDM, and glycidyl methacrylate is represented as GMA. The amount of the diluent used means parts by mass of the diluent based on a total of 100 parts by mass of monomers. The amount of potassium hydroxide used means parts by mass based on 100 parts by mass of porous particles.

To purify biopolymers, it is preferable that the pressure drop be 1.2 MPa or less, the hydrophilicity be 1.0 to 1.4, the ionicity be 0.8 to 1.2, and the exclusion limit molecular weight be 1,000,000 or more as determined by the present measurement methods. Examples 1 to 10 satisfied all these criteria.

TABLE 1

| | Amount of GMA*[1] [mol %] | Amount of GDM*[2] [mol %] | Amount of diluent used*[3] | Sugar alcohol | Amount of potassium hydroxide used*[4] | Concentration of sulfuric acid [M] | Ring-opening rate of glycidyl groups [%] | Volume-average particle diameter [μm] | Pressure drop [MPa] | Hydrophilicity | Ionicity | Exclusion limit Molecular Weight |
|---|---|---|---|---|---|---|---|---|---|---|---|---|
| Example 1 | 80 | 20 | 158 | D-sorbitol | 6.4 | 0.15 | 100 | 10.2 | 0.6 | 1.2 | 1.1 | 1,100,000 |
| Example 2 | 80 | 20 | 158 | D-sorbitol | 25.0 | 0.15 | 100 | 10.3 | 0.6 | 1.2 | 1.2 | 1,100,000 |
| Example 3 | 80 | 20 | 158 | D-sorbitol | 2.5 | 0.15 | 100 | 10.2 | 0.8 | 1.2 | 1.1 | 1,100,000 |
| Example 4 | 80 | 20 | 158 | D-sorbitol | 6.4 | 0.50 | 100 | 10.3 | 0.7 | 1.2 | 1.2 | 1,100,000 |

TABLE 1-continued

| | Amount of GMA*1 [mol %] | Amount of GDM*2 [mol %] | Amount of diluent used*3 | Sugar alcohol | Amount of potassium hydroxide used*4 | Concentration of sulfuric acid [M] | Ring-opening rate of glycidyl groups [%] | Volume-average particle diameter [μm] | Pressure drop [MPa] | Hydro-philicity | Ionicity | Exclusion limit Molecular Weight |
|---|---|---|---|---|---|---|---|---|---|---|---|---|
| Example 5 | 80 | 20 | 158 | D-sorbitol | 6.4 | 0.05 | 100 | 10.2 | 0.6 | 1.3 | 1.1 | 1,100,000 |
| Example 6 | 94 | 6 | 158 | D-sorbitol | 6.4 | 0.15 | 100 | 10.3 | 1.0 | 1.2 | 1.2 | 1,500,000 |
| Example 7 | 71 | 29 | 158 | D-sorbitol | 6.4 | 0.15 | 100 | 10.5 | 0.4 | 1.4 | 1.2 | 1,000,000 |
| Example 8 | 80 | 20 | 105 | D-sorbitol | 6.4 | 0.15 | 100 | 10.5 | 0.5 | 1.2 | 1.1 | 1,000,000 |
| Example 9 | 80 | 20 | 316 | D-sorbitol | 6.4 | 0.15 | 100 | 10.5 | 1.0 | 1.2 | 1.1 | 1,500,000 |
| Example 10 | 80 | 20 | 158 | xylitol | 6.4 | 0.15 | 100 | 10.2 | 1.2 | 1.2 | 1.2 | 1,100,000 |
| Comparative Example 1 | 80 | 20 | 158 | — | — | 0.15 | 100 | 10.2 | 1.4 | 1.3 | 3.5 | 1,100,000 |
| Comparative Example 2 | 80 | 20 | 158 | D-sorbitol | 6.4 | — | 15 | 10.3 | 0.6 | 1.7 | 1.3 | 1,100,000 |
| Comparative Example 3 | 80 | 20 | 158 | — | — | — | 0 | 10.1 | 1.2 | 1.9 | — | 1,100,000 |
| Comparative Example 4 | Shodex (registered trademark) OHpak (registered trademark) SB-804HQ | | | | | | | 10*5 | 1.5 | 1.2 | 1.2 | 1,000,000 |

*1GMA (glycidyl methacrylate)
*2GDM (glycerol 1,3-dimethacrylate)
*3Parts by mass relative to 100 parts by mass of monomers
*4Parts by mass relative to 100 parts by mass of porous particles
*5The value in the catalog

The invention claimed is:

1. A packing material for size exclusion chromatography, comprising porous particles comprising copolymer particles comprising at least glycerol 1,3-dimethacrylate and glycidyl methacrylate as monomer units and a structure represented by the following formula (I) on a surface of the copolymer particle:

[Chem. 1]

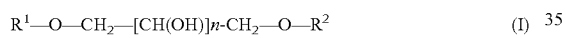

$$R^1-O-CH_2-[CH(OH)]n\text{-}CH_2-O-R^2 \qquad (I)$$

wherein $R^1$ represents a partial structure of the porous particles, $R^2$ represents a hydrogen atom, and n represents 4 or 5, wherein the partial structure has a glycidyl group that reacts with a primary hydroxyl group of a sugar alcohol to form an ether linkage with the porous particle, and wherein a ring-opening rate of glycidyl groups of the porous particles is 95% or more.

2. The packing material for size exclusion chromatography according to claim 1, wherein the copolymer comprises 6 to 29 mol % of glycerol 1,3-dimethacrylate and 71 to 94 mol % of glycidyl methacrylate as the monomer units.

3. The packing material for size exclusion chromatography according to claim 1, wherein n in the formula (I) is 4.

4. A column for size exclusion chromatography, comprising a housing for liquid chromatography and the packing material according to claim 1 packed into the housing for liquid chromatography.

5. A chromatography apparatus comprising the column for size exclusion chromatography according to claim 4.

6. A method for separating and fractionating biopolymers, comprising separating the biopolymers with an aqueous eluent using the column for size exclusion chromatography according to claim 4.

* * * * *